United States Patent [19]

Shemenski, Sr.

[11] 4,269,877
[45] May 26, 1981

[54] AROMATIC TRIAZOLE, PRECIPITATION COMPOUND AND OXIDIZING COMPOUND FOR INCREASED SURFACE PROTECTION AND IMPROVED ADHESION OF BRASS COATED STEEL TO RUBBER

[75] Inventor: Robert M. Shemenski, Sr., North Canton, Ohio

[73] Assignee: The Goodyear Tire & Rubber Company, Akron, Ohio

[21] Appl. No.: 616,704

[22] Filed: Sep. 25, 1975

Related U.S. Application Data

[63] Continuation-in-part of Ser. No. 567,586, Apr. 14, 1975.

[51] Int. Cl.³ .................... B05D 3/02; B05D 3/00; B29H 17/08; B29H 17/10
[52] U.S. Cl. ................... 427/327; 148/614 R; 152/356 R; 156/124; 427/384; 427/401
[58] Field of Search .................... 152/356 R, 359; 156/110 A, 124, 308, 316; 427/388, 327, 384, 401; 260/876 R; 148/6.14 R

[56] References Cited

U.S. PATENT DOCUMENTS

| | | | |
|---|---|---|---|
| 2,387,498 | 10/1945 | Cox | 174/120 |
| 3,360,390 | 12/1967 | Thompson et al. | 427/180 X |
| 3,423,230 | 1/1969 | Georges | 156/110 A |
| 3,542,639 | 11/1970 | Manino | 156/110 A |
| 3,806,392 | 4/1974 | Baker et al. | 156/110 A |
| 3,846,160 | 11/1974 | Hirakawa et al. | 156/110 A |
| 3,905,947 | 9/1975 | Cowell et al. | 156/110 A |

OTHER PUBLICATIONS

*Tire Technology*, F. J. Kovac, Goodyear Tire & Rubber Co., 4th Edition, 1973, pp. 29, 30.

*Primary Examiner*—Michael R. Lusignan
*Attorney, Agent, or Firm*—H. C. Young, Jr.

[57] ABSTRACT

The vulcanized aged adhesion of rubber to clean brass coated steel cord is improved by the use of benzotriazole (BTA) and/or a precipitation compound such as cyclohexylamine borate and/or an oxidation compound such as zinc chromate. These agents are added directly to the surface of the cord or to the rubber immediately adjacent to the cord. BTA treatment reduces surface degradation of the cord and the precipitation compound and oxidation compound aid in improving aged adhesion. Preferably the cord is cleaned in an acid dip, which can be used to deposit desired anions on the cord surface, prior to treatment.

2 Claims, No Drawings

AROMATIC TRIAZOLE, PRECIPITATION COMPOUND AND OXIDIZING COMPOUND FOR INCREASED SURFACE PROTECTION AND IMPROVED ADHESION OF BRASS COATED STEEL TO RUBBER

This application is a continuation-in-part application of application Ser. No. 567,586 filed Apr. 14, 1975.

This invention relates to increased surface protection of brass coated steel and improved vulcanized adhesion between brass coated steel and rubber. More particularly, this invention relates to improved factory processing of brass coated steel tire cord by increasing maximum storage life and minimizing surface contamination of brass coated steel tire cord, in addition to improving adhesion between brass coated steel cord and rubber in steel belted reinforced pneumatic vehicle tires.

Pneumatic vehicle tires are often reinforced by means of brass coated steel cord. This tire cord is frequently high carbon steel or high carbon steel coated with a thin layer of alpha brass. The brass coated high carbon steel cord is normally prepared by heat treating and extruding the steel to form a steel cord. The steel cord is then coated with the brass. The brass coated cord is drawn, and then can be stranded. Such brass coated steel tire cord requires special care during factory processing to minimize surface contamination. Good adhesion to rubber requires a clean surface. It is important that the initial or original adhesion between the steel tire cord and the rubber immediately adjacent thereto be satisfactory to provide structural integrity to the composite. Further, it is important that this adhesion level be retained as much as possible throughout the service life of the product. Industry is therefore investigating various ways of protecting brass coated steel tire cord prior to rubber encapsulation and improving both initial adhesion and aged adhesion.

Clean, untreated brass coated steel wire will normally have sufficient good initial adhesion to the adjacent rubber. However, the adhesion usually will drop with time, i.e., with aging due to heat, stress and/or chemical degradation or corrosion effects. Other additives described in the literature have been tried which improve both initial and aged adhesion. Yet these additives have not proved satisfactory either due to required complexities in their preparation or the mixed results realized from their use, i.e., some types of aging would show improved adhesion and others show no improvement. It is therefore desirable that an agent be found which protects the bare metallic surface and does not adversely affect initial adhesion to any great degree, while at the same time proving aged adhesion of a vulcanized composite. Lastly, it is necessary that such processing ultimately improve aged adhesion be relatively simple and therefore economically feasible in competitive manufacturing.

A method for preventing deterioration of adhesion between metal cord and rubber has been taught in Belgian Pat No. 786,059 and German Pat. No. 2,227,013. This method advises dipping the cord into a mineral oil solution of a salt of an organic acid and a long chain aliphatic amine, or in a mixture of this solution and a very low level of benzotriazole. However, the success of this method requires preparing and combining organic compounds in an oil solvent. This processing is not ideally suited to a manufacturing operation in a competitive market where economics and simplicity are at a premium.

It is an object of the present invention to provide a technique to protect and to maintain a clean surface on brass coated steel through inventory storage and factory processing. Further, it is an object of the present invention to provide a method for improving initial or original adhesion between brass coated steel and rubber. It is another object of the present invention to provide a method for improving aged adhesion between brass or brass coated steel tire cord and the rubber immediately adjacent thereto. In addition, it is the object of the present invention to accomplish these goals efficiently in a manner economically feasible for use in competitive manufacturing of brass coated steel/rubber composites. Other objects will become apparent as the description proceeds.

The objects of the present invention are accomplished by treating a clean brass coated steel cord with benzotriazole (BTA) and/or an anion which aids in the formation of a protective film either through a precipitation and indirect oxidizing (buffering) mechanism, (hereinafter referred to as precipitation anion, and/or an anion which forms a film by directly oxidizing metallic ions in the substrate surface, (hereinafter referred to as an oxidation anion. Normally the anions, whether precipitation or oxidation, will be donated by a salt. A salt donating precipitation anion will be referred to hereinafter as a precipitation compound and a salt donating an oxidation anion will be referred to hereinafter as an oxidation compound.

The precipitation anions include anions selected from the group consisting of borate, phosphate, metaphosphate, sulfate, silicate, carbonate, nitrate, arsenate and iodate.

The oxidation anions include anions selected from the group consisting of chromate, nitrite, tungsdate, molybdate, dichromate, arsenite, and sulfite.

The specific cation of the salts containing these anions may be any cation, but preferred is cyclohexyl amine, iron, cobalt, nickel, tin or zinc. Potassium and sodium are illustrations of other cations which can also be used.

It is believed that protection of brass coated steel cord is realized by formation of a complex polymeric film comprised of BTA plus precipitation anion and/or oxidation anion plus water molecules and/or hydroxyl ions supplied by the water. The precipitation anions require the presence of oxygen in the vicinity of the metal surface whereas the oxidation anions can operate in the absence of oxygen.

The method of treatment with the anions, and compounds containing said anions, is not important to the practice of the present invention. For example, they can be used to coat the metal and/or can be added to the rubber immediately adjacent to the metal.

The manner or order in which these anions or agents containing the anions come into contact with the surface of the metal is not important to the performance per se of the present invention, but only to the degree of performance and ease of manufacturing. The metal can be coated by applying a solution or suspension of BTA, a precipitation anion and/or an oxidation anion to the metal and evaporating the solvent or suspending medium. For example, tire cord can be dipped into an aqueous solution of BTA, precipitation compound (e.g. cyclohexyl amine borate) and/or oxidation compound (e.g., zinc chromate) and dried by a blast of hot air. The foregoing are illustrative methods and not limiting. The BTA and precipitation compound and/or oxidation compound can be added alone or in combination directly to the surface of the cord. If added separately, the order of addition to the surface of the cord is not critical. However, a single aqueous solution containing all the additives to be used is most efficient and economical. In selecting a combination of additives, consideration must be given to the degree of compatibility of this combination with the rubber compound as well as the effect of these agents upon the particular vulcanization system selected for vulcanizing the rubber. When BTA is applied to the metal in solution form, e.g., as an aqueous solution, the concentration of BTA in solution is from 0.001 weight percent to 1.0 weight percent, preferably 0.01 to 0.5 weight percent. The precipitation and oxidation compounds can be applied to brass coated steel surfaces by using aqueous solutions containing 50 ppm to 10,000 ppm, preferably 200 ppm to 2,000 ppm. The above statements as to amounts are intended to be used as guidelines and not as limitations.

As indicated earlier, the method of applying BTA and/or additional anions to a metallic surface is not critical. For example, another alternative method involves the addition of BTA or anion to the medium or agent used to lubricate brass coated steel wire during the final drawing process. However, as with the rubber compound, care must be exercised to use a lubricant that is compatible with the BTA and anion, i.e., the lubricant must retain its lubricating properties and not decompose upon addition of these additives. Naturally any combination of these methods can be used, as mentioned earlier herein.

Benzotriazole alone has been found to protect brass coated steel tire cord during inventory storage and factory processing prior to rubber encapsulation. The precipitation anion and oxidation anion, alone or in combination increase the aged adhesion of vulcanized brass coated steel plus rubber composites. However, it has been discovered that the use of BTA together with either type of anion and preferably in combination with at least one anion from both types, results in an optimum combination of surface protection of brass coated steel prior to rubber encapsulation, plus adhesion promoting effects in the vulcanized brass coated steel/rubber composite. These agents may be applied by dipping singularly or in combination. The order of the dipping process is not important. The metal surface must be adequately dried after dipping. The weight ratio of BTA to total anion is normally from 5:1 to 1:100, preferably from 1:1 to 1:25. These ratios are guidelines only and in no way intended to be limitations.

The brass coating of a typical brass coated steel coard is microscopically porous, thereby exposing small areas of steel surface to any surrounding environment. It is believed that BTA interacts with copper in a brass coating to form a polymeric complex of BTA plus copper. This polymeric complex is insoluble in most solvents and serves as a protective barrier to any environmental degradation of the underlying brass. On the other hand, anions from the salts added, it is theorized, interact with iron and iron oxide from steel surfaces exposed through microscopic pores to form an adherent oxide film which protects the steel. It is not necessary that the barrier layers of polymeric complexes absorbed be extremely thick. In fact, such layers should not be so thick as to preclude all migration of copper from the brass through the protective coating to the rubber interface. Adhesion of rubber to metal cord requires the formation of copper-sulfur bonds. It is believed that adsorbed excess amounts of BTA and/or anion serve as a reservoir to complex with new steel surfaces exposed or additional copper released during service of a rubber produced reinforced with treated cord.

It is not practical to describe the weights of polymeric complex to be formed or the amounts of BTA and anion to be applied much less the thickness of the respective barrier layers. Optimum thicknesses and amounts are a function of variables such as nature of the brass surface, viz., mode of deposition thickness of initial oxide layers, magnitude of residual stresses, copper content, brass thickness, as well as the reactivity of the rubber-vulcanization system. However, as very general guidelines, but not in any sense limitations, the total barrier layers should nominally be less than 100 angstroms and preferably not in excess of 1000 angstroms.

The practice of the present invention results in increased surface protection of brass-coated steel prior to rubber encapsulation and improved aged-adhesion, in many cases with improved initial, i.e., original adhesion of vulcanized brass-coated steel/rubber composites.

The rubber surrounding the metal can be any rubber, preferably diene rubbers such as natural rubber, rubbery copolymers of butadiene with styrene or acrylonitrile, polybutadiene and polyisoprene and can be compounded in any of the conventional manners, e.g., with carbon black, sulfur, etc. However, as recited earlier, the effect of the BTA and/or anion on vulcanization systems should be considered and the vulcanization system adjusted accordingly.

Aged metal to rubber adhesion is particularly poor when the rubber contains oxygen, moisture, and an amine resin capable of releasing ammonia. For example, rubbers containing hexamethylenetetramine (HMTA) such as in a resorcinol/HMTA in situ resin system, where oxygen and moisture levels are sufficiently high, can tend to have poor aged-adhesion to brass or brass coated steel. The use of BTA and/or anions is particularly benefical in such systems. Further, BTA coatings on in-process wire protect the wire from deleterious effects of moisture (humidity) and oxidation, i.e., improve factory storage life.

BTA is well known in the art and preparation is described in the literature, viz., "Aromatic Triazoles Inhibit Corrosion of Copper and Copper Alloys", C. J. Korpics, Materials Performance, Feb. (1974) and "CO-BRATEC", Technical Bulletin No. 531, The Sherwin-Williams Company.

The structural formula for cyclohexylamine borate is:

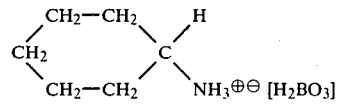

CHAB is supplied by U.S. Borax and Chemical Corp. CHAB can be prepared according to U.S. Pat. No. 3,360,390, "Use of Alkylamine Borates as Corrosion Inhibitor for Ferrous Metal", U.S. Borax and Chemical Corp., Los Angeles, Calif. The other anion providing salts are standard laboratory reagents.

By the term "high-carbon" steel as used in the present specification and claims, applicant is referring to what is known as carbon steel, also called ordinary steel, also called straight carbon steel or plain carbon steel, e.g., American Iron and Steel Institute Grade 1070 high-carbon steel (AISI 1070). Such steel owes its properties chiefly to the presence of carbon without substantial amounts of other alloying elements. In this respect see Metals Handbook, The American Society for Metals, Metals Park, Cleveland, Ohio.

By "brass" applicant refers to alpha brass or compositions in which the major component is alpha brass, i.e., which contain from about 65 to 75 percent copper and 35 to 25 percent zinc, respectively.

The following examples contain illustrations of, but do not limit the practice of the present invention.

The following experimental procedures were used in all the working examples contained herein. Exceptions or additions to these procedures, if applicable, are given in the respective example.

Brass-plated (68.3±0.3%, Cu, 31.7±0.3% Zn, coating weight=5.13±0.13 gram brass per KG steel wire) steel (AISI grade 1070) cable having a 5×0.25 construction was used in all of the examples.

Rubber compound A was prepared using the following formulation.

| Ingredients | Parts by Weight |
|---|---|
| Natural rubber | 100 |
| Peptizer | 0.1 |
| Resorcinol | 3 |
| Processing oil | 10 |
| Stearic acid | 2 |
| Furnace black | 55 |
| Zinc oxide | 10 |
| Hexamethylene tetramine | 2 |
| Antioxidant | 0.75 |
| Accelerator | 1 |
| Retarder | 5 |
| Sulfur | 5 |

Rubber B was the same as A with the exception that silica was substituted for the carbon black.

Rubber C was the same as A with the following exceptions. Cobalt naphthanate (2.5 parts) replaced the resorcinol and hexamethylene tetramine, and the accelerator and sulfur levels were changed to 0.5 and 8 parts respectively.

Rubber D was the same as Rubber C with the exception that the accelerator and sulfur levels were 3 and 6.5 parts respectively.

The metal cord used was brass-plated steel (AISI 1070) wire which was cold drawn from 1.14 mm to 0.25 mm by using a Vaughn Drawing Machine and a standard lubricant having an oleic acid base. Cables (5×0.25) were made by using standard bunching and-/or stranding equipment.

Surface treatments of the wire were accomplished by dipping cables in test solutions at 60° C. for one minute followed by drying by a blast of hot air. Standard static adhesion test blocks were used having one-half inch cable imbedment. All blocks were vulcanized at 300° F. for 30 minutes and 28,000 pounds pressure.

Original static adhesion measurements were made after vulcanization and room temperature aging of the vulcanizate for 24 hours.

Humidity-aged adhesion measurements were made on vulcanized blocks after aging for 6 hours at 150° C. in a pressurized cylinder (4–60 psi) filled with air containing a significant moisture content. The blocks were allowed to stabilize at ambient temperature and pressure for 24 hours before testing.

The salt water immersion corrosion-aging adhesion measurements were made after total immersion of the vulcanized adhesion blocks in a 5 percent NaCl, aqueous solution at 90° C. for a specified period of time. The blocks were allowed to stabilize for 24 hours at room temperature in air before pulling.

The green-block humidity aging measurements were made on unvulcanized adhesion blocks which had been aged at 25° C., 38° C. and 77° C. and 98 percent relative humidity for 3 and 7 days before vulcanization. Static adhesion was then measured in the standard manner (ASTM Designation D 2229-73 "Standard Method of Testing for Adhesion of Vulcanized Rubber to Steel Cord").

Adhesion is defined herein as being a function of the interfacial bonding strength between brass-coated steel cord surface and rubber matrix measured by (1) force in pounds (lbs) required to pull the test cord from a standard static adhesion block having one-half inch imbedment of metal into rubber by using standard Instron testing machine and (2) the percent rubber coverage (RC) remaining on the one-half inch metal imbedment after pulling the cord out of the adhesion block, as visually estimated.

Adhesion values herein are calculated according to the following relationship.

$$\text{Adhesion} = \frac{\frac{\text{Pounds Pull (experimental)}}{\text{Pounds Pull (control)}} + \frac{R/C \text{ (experimental)}}{R/C \text{ (control)}}}{2} \times 100$$

The control involved the use of the clean, untreated cord.

Brass coated steel wire was treated with various compounds and stored at 100° F. and 90 percent relative humidity for 350 hours. The wire was then evaluated mircoscopically to determine the percent of the surface covered with rust.

TABLE 1

| Treatment | Rust Coverage (%) after 350 Hrs. |
|---|---|
| None | 100 |
| CHAB | 90–100 |
| Sodium chromate and sodium phosphite | 60–75 |
| CHAB + BTA | 25–35 |
| BTA | 0–5 |

As shown above, BTA treatment was far superior to any other treatment.

In this respect it should be noted that none of the treatments offer significant beneficial effects if the wire is substantially corroded before the treatment is accomplished.

Wire was dipped in aqueous BTA solutions. Adhesion ratings are given in Table 2.

TABLE 2

Effect of Benzotriazole Dip Concentration on Adhesion Levels

Wire Treatment:
　　I: Control
　　II: 1 W/O* Benzotriazole (BTA) in water
　　III: 2 W/O BTA in water
　　IV: 4 W/O BTA in water
　　V: 6 W/O BTA in water
Results: Adhesion Rating
　　(All in compound A)

Salt Water Corrosion Aged

TABLE 2-continued

Effect of Benzotriazole Dip Concentration on Adhesion Levels

| Wire Treatment | Original Static Adhesion | Humidity Aged | ½ Hr | 4 Hrs | % Change of Adhesion After 4 Hours Corrosion |
|---|---|---|---|---|---|
| I | 100 | 40 | 82 | 47 | −53 |
| II | 98 | 47 | 95 | 56 | −43 |
| III | 105 | 50 | 99 | 55 | −48 |
| IV | 102 | 50 | 81 | 59 | −42 |
| V | 76 | 47 | 77 | 81 | +8 |

*W/O = percent by weight

As indicated by the above data, BTA treatment improved both humidity aged and salt water aged adhesion.

TABLE 3

Improved Adhesion of Brass-Coated Steel Tire Cord Achieved by Using Benzotriazole Additions to Standard Oleic Acid Base Drawing Lubricant Wire Treatment:
  I: As drawn using standard lubricant
  II: Standard lubricant + 0.05 W/O BTA added
  III: Standard lubricant + 0.5 W/O BTA added
Results: Adhesion Ratings

| Wire Treatment | Rubber | Original Adhesion | Humidity Aged | Salt-Water Corrosion Aged 4 Hrs | 8 Hrs | 24 Hrs |
|---|---|---|---|---|---|---|
| I | A | 100 | 56 | 16 | 15 | 9 |
| II | A | 102 | 63 | 20 | 17 | 11 |
| III | A | 100 | 59 | 22 | 22 | 33 |
| I | B | 100 | 70 | 50 | 47 | 33 |
| II | B | 170 | 91 | 54 | 81 | 42 |
| III | B | 155 | 75 | 69 | 49 | 34 |
| I | C | 100 | 55 | 85 | 101 | 43 |
| II | C | 114 | 60 | 105 | 109 | 58 |
| III | C | 133 | 89 | 102 | 130 | 78 |

Again the overall adhesion ratings using BTA were superior.

TABLE 4

Improved Adhesion of Brass-Coated Steel Tire Cord Treated With Benzotriazole and Aged 100 Days in a Factory Environment at Room Temperature Wire Conditions:
  I: Control
  II: Dipped 2 W/O aqueous BTA
  III: Standard lubricant + 0.05 W/O BTA
  IV: Standard lubricant + 0.05 W/O BTA then dipped in 2 W/O aqueous BTA
  V: Standard lubricant + 0.5 W/O BTA
  VI: Standard lubricant + 0.5 W/O BTA then dipped in 2 W/O aqueous BTA
Results: Adhesion Ratings
  (All Compound A)

| Wire Condition | Original Adhesion | Humidity Aged | Salt-Water Corrosion Aged 4 Hrs | 8 Hrs | 24 Hrs |
|---|---|---|---|---|---|
| I | 100 | 45 | 49 | 48 | 33 |
| II | 102 | 52 | 71 | 55 | 43 |
| III | 113 | 48 | 66 | 72 | 52 |
| IV | 96 | 47 | 82 | 64 | 35 |
| V | 103 | 51 | 71 | 61 | 41 |
| VI | 99 | 48 | 78 | 55 | 39 |

As indicated above BTA improved the overall adhesion properties.

TABLE 5

Improved Adhesion of Untreated Brass-Coated Steel Tire Cord to Rubber Containing Benzotriazole Results: Adhesion Ratings

| Test Conditions | Control Compound D (No Additions) | Comp. D + 2.0 Parts BTA | Comp. D + 1.0 Part BTA | Comp. D + 0.5 Part BTA | Comp. D + 0.25 Part BTA | Comp. D + 0.10 Part BTA | Comp. A (No Additions) |
|---|---|---|---|---|---|---|---|
| Original Hot Adhesion 46 min/300° F. | 100 | 100 | 101 | 123 | 115 | 126 | 130 |
| Hot Adhesion 46 min/300° F. Green Block Aged in Ambient Air | | | | | | | |
| 1 Day | 114 | 112 | 104 | 114 | 117 | 118 | 130 |
| 7 Days | 117 | 111 | 112 | 121 | 122 | 117 | 141 |
| 14 Days | 119 | 119 | 126 | 119 | 121 | 119 | 126 |
| Hot Adhesion 46 min/300° F. Green Block Aged at 98% Relative Humidity and 100° F. | | | | | | | |
| 3 Days | 94 | 86 | 105 | 117 | 122 | 114 | 88 |
| 7 Days | 60 | 107 | 109 | 103 | 113 | 122 | 75 |
| 14 Days | 90 | 87 | 88 | 104 | 99 | 110 | 86 |
| Hot Adhesion 46 min/300° F. Cured Block Aged at 98% Relative Humidity and 170° F. | | | | | | | |
| 3 Days | 76 | 104 | 93 | 107 | 103 | 111 | 60 |
| 7 Days | 86 | 90 | 75 | 79 | 92 | 71 | 52 |

TABLE 6

Improved Adhesion of Brass-Coated Steel Tire Cord Treated in Benzotriazole, Cyclohexylamine Borate, or a Combination of Benzotriazole and Cyclohexylamine Borate
Results: Adhesion Rating (all in Compound A)

| Wire Treatment | Original Adhesion | Humidity Aged | Salt Water Corrosion Aged | | |
|---|---|---|---|---|---|
| | | | 4 Hours | 8 Hours | 24 Hours |
| Control | 100 | 34 | 35 | 30 | 25 |
| Dipped in 0.5 W/O BTA in alcohol | 126 | 36 | 60 | 32 | 29 |
| Dipped in 2.0 W/O BTA in alcohol | 107 | 41 | 73 | 32 | 30 |
| Dipped in 0.01M cyclohexylamine diborate in alcohol | 122 | 42 | 88 | 71 | 33 |
| Dipped in 0.01M cyclohexylamine diborate + 2W/O BTA in alcohol | 102 | 39 | 67 | 31 | 38 |
| Dipped in 0.01M cyclohexylamine tetraborate in alcohol | 118 | 41 | 103 | 56 | 39 |
| Dipped in 0.01M cyclohexylamine diborate + 0.01M cyclohexylamine tetraborate + 2 W/O BTA in alcohol | 112 | 43 | 56 | 35 | 27 |
| Dipped in 0.01M cyclohexylamine tetraborate + 2W/O BTA in alcohol | 101 | 40 | 83 | 39 | 30 |

The data in Table 5 indicate that even low levels of BTA can be quite effective.

The treated wire in Table 6 again exhibited superior overall adhesion when compared with untreated wire.

Brass coated steel cord was treated using sequential adddition of the CHAB and BTA at different concentrations in alochol (CHAB) and water (BTA), the cord being dipped first in the CHAB solution and then the BTA solution. Again the overall adhesion properties were improved. Compound A was the rubber used.

Further data was obtained on other embodiments of the present invention.

The cables were 5×0.25 unless otherwise noted.

Surface treatments of the steel cord were accomplished by ultrasonically cleaning the as-received cord in OAKITE 33 (contains 10% phosphoric acid), rinsing with water, dipping for 20 seconds in test solutions at 60° C., and drying for 60 seconds in an infrared oven at 150°-175° C. Continuous lengths of wire several thousands of feet long were produced in each test. Samples were randomly selected from this test run. Standard static adhesion test blocks were used one-half inch cable imbedment. All blocks were vulcanized at 300° F. for 46 minutes and 28,000 pounds pressure.

The green-block humidity aging and bare cord aged measurements were made on unvulcanized adhesion blocks and bare cords which had been aged at 38° C. and 98 percent relative humidity for 2 to 5 days before vulcanization.

Bare brass-coated steel cords (3×0.20+6×0.38) were dipped in various solutions and then subsequently aged for 7 days at 38° C. and 100 percent relative humidity. After aging, the bare cords were vulcanized in standard test blocks and these blocks tested in the original condition and after additional pressurized aging of the cured blocks for 6 hours at 150° C. Adhesion ratings are summarized in Table 7.

TABLE 7

Effect of Surface Treatment on Initial and Aged-Adhesion for As-Dipped and Aged Cords Wire Treatment: (all in aqueous solutions)
 I: Control
 II: 0.2 W/O* Benzotriazole (BTA) in water
 III: 0.5 W/O BTA in water
 IV: 0.5 W/O BTA + 300 ppm cyclohexylamine borate (CHAB)
 V: 0.5 W/O BTA + 381 ppm sodium borate
 VI: 0.5 BTA + 380 ppm sodium phosphate
 VII: 0.5 W/O BTA + 234 ppm sodium chromate
 VIII: 0.5 W/O BTA + 70 ppm sodium nitrite

TABLE 7-continued

Effect of Surface Treatment on Initial and Aged-Adhesion for As-Dipped and Aged Cords Results: Adhesion Rating (all in compound B)

| Wire Treatment | Vulcanized Original Adhesion | | Vulcanized Aged-Adhesion | |
|---|---|---|---|---|
| | As-Dipped Cord | Aged Cord | As-Dipped Cord | Aged Cord |
| I | 100 | 62 | 45 | 20 |
| II | 99 | 79 | 42 | 34 |
| III | 109 | 110 | 51 | 37 |
| IV | 101 | 95 | 50 | 48 |
| V | 96 | 109 | 57 | 53 |
| VI | 105 | 88 | 49 | 64 |
| VII | 100 | 107 | 65 | 70 |
| VIII | 102 | 105 | 55 | 58 |

*W/O = weight percent

As indicated by the above data, dipping substantially improved the adhesion of the aged bare cord. In addition, vulcanized aged adhesion was improved for as-dipped cord.

Vulcanized aged adhesion, both humidity and salt water aging, of cords dipped in several solutions is given in Table 8.

TABLE 8

Vulcanized Aged Adhesion

Wire Treatment: (all aqueous solutions)
 I: Control
 II: Sodium nitrite (1000 ppm)
 III: Sodium nitrite (1000 ppm) + 0.5 W/O BTA
 IV: Sodium Chromate (1000 ppm)
 V: Sodium borate (1000 ppm)
 VI: Sodium phosphate (1000 ppm)
Results: Adhesion Rating (all in compound B)

| Wire Treatment | Original Adhesion | Humidity-Aged Adhesion | Salt-Water Aged Adhesion |
|---|---|---|---|
| I | 100 | 73 | 53 |
| II | 111 | 27 | 49 |
| III | 136 | 112 | 71 |
| IV | 103 | 69 | 74 |
| V | 110 | 101 | 87 |
| VI | 86 | 79 | 71 |

These data show that dipping improves the level of vulcanized aged adhesion and that the combination of BTA plus anion is better than the anion viz., nitrite, used alone. It should be noted that the nitrate data (II) is atypically low.

Brass-plated steel tire cords were dipped in an aqueous solution containing 0.5 W/O BTA, 300 ppm CHAB, and 234 ppm sodium chromate. Both as-received (control) and dipped cords were aged bare and in unvulcanized (green) test blocks for 2 and 5 days at 38° C. and 100 percent relative humidity. Adhesion results are given in Table 9.

TABLE 9

Effect of Surface Treatment on Humidity Aged Bare Cords and Unvulcanized Rubber Blocks Cord Condition:
  I Initial condition (control or dipped)
  II Green block humidity-aged 2 days
  III Bare cords humidity-aged 2 days
  IV Green block humidity-aged 5 days
  V Bare cords humidity-aged 5 days
Results: Vulcanized adhesion ratings
  (all in compound C)

| Cord Condition | CONTROL CORD | | | DIPPED CORD | | |
|---|---|---|---|---|---|---|
| | Orig. Adhes. | Humid Aged Adhes. | Salt Water Adhes. | Orig. Adhes. | Humid Aged Adhes. | Salt Water Adhes. |
| I | 100 | 82 | 42 | 71 | 63 | 45 |
| II | 65 | 116 | 28 | 69 | 78 | 46 |
| III | 39 | 38 | 29 | 75 | 76 | 48 |
| IV | 24 | 47 | 19 | 67 | 66 | 34 |
| V | 21 | 28 | 17 | 72 | 79 | 28 |

These data show that dipping improves adhesion as the severity of aging increases, especially for bare cord.

The beneficial effects of the various components of the dip solutions, viz., BTA, Group A anion, Group B anion, etc., are not merely additive. This can be illustrated by examining the results of dip-bath computer optimization for a representative tire cord treatment.

The cord must be clean to benefit by the treatment described herein. Preferably it is cleaned to remove adhering oils, lubricants, oxidized scales, protective coatings and/or dirt remaining from the manufacturing process. This is done preferably ultrasonically in a suitable solvent, such as aqueous solutions of ammonium hydroxide or HCl. Preferably the solvent is capable of depositing anions reactive with the iron on the surface of the cord, for example precipitation and oxidation anions. Such solvents include but are not limited to phosphoric acid, sulfuric acid, chromic acid and nitric acid which will deposit phosphate, sulfate, chromate and nitrate ions respecitvely.

Once the cord is plated with the brass, treatment can begin. Normally no cleaning is necessary if the BTA is used shortly after the plating process when no substantial corrosion and/or contamination of the surface has occurred, although cleaning may be done. Treatment can occur with the BTA and/or anions between the plating and drawing steps or between the drawing and stranding steps or even on the final cord prior to calendering. The later in the process the treatment is done, the more important is the cleaning step.

In a preferred embodiment of the present invention, the brass plated cord is cleaned (preferably ultrasonically) by dipping in an anion-producing solvent and then treated before drawing with an aqueous solution containing BTA, a precipitation anion and an oxidation anion.

Water is a preferred solvent since its use results in improved adhesions due to possible interaction of the water with the coatings on the wire.

Any compound can be substituted for BTA which complexes with the copper in the brass to form an insoluble film, i.e., insoluble in any of the environments to which the material is to be exposed. These compounds include triazoles, imidazoles and indazoles. Such compounds include those having the following structural formula:

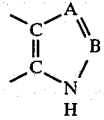

wherein the adjacent carbon atoms are joined to form a benzene or naphthylene ring, said ring being substituted (for example, with a single methyl group) or unsubstituted and wherein A and B are selected from the group consisting of —N— or —CH—, with the proviso that A and B are never both —CH—.

Compounds conforming to such a structure which illustrate but do not limit the scope of the present invention are benzotriazole, tolyltriazole, benzimidazole, indazole and naphthatriazole.

Consideration should be given to the choice of cation to be used with the anion on the basis that the cation might interfere with the performance of the compounds used in treating the cord. For example, copper could interfere with the performance of the BTA.

The temperature/time conditions involved with the treatment of the cord with either the BTA type compound and/or an anion can be varied. A preferred embodiment involves a temperature of at least 60° C. and a residence time of 23 seconds.

It should be noted that the BTA type compounds and the precipitation and oxidation anion containing compounds need not be soluble in water although it is preferred that they are. Suspensions of these compounds in water can be used as well as solutions to treat the cord. Other solvents or suspension systems can naturally be used.

In addition to the previous guidelines as to amounts, the following guidelines can be used. The amount of BTA added to the rubber can vary from about 0.01 part to about 2.0 parts by weight per 100 parts by weight of rubber, preferably 0.05 to 1.0 part and most preferably 0.10 to 0.50 part. The amount of CHAB or other precipitation or oxidation compound added to the rubber can vary from about 0.1 part to about 3.0 parts by weight per 100 parts by weight or rubber, preferably 0.50 to 2.0 parts. In this respect, consideration must be given to the degree of compatibility of the BTA and/or CHAB or other precipitation or oxidation compound with the rubber compound as well as the effect of these agents upon the particular vulcanization system selected for vulcanizing the rubber. When BTA is applied to the metal in solution form, e.g., as an aqueous or alcoholic solution, the concentration of BTA in solution is from 0.10 weight percent to 4.0 weight percent, preferably 0.1 to 2.0 weight percent. CHAB can be applied to brass coated steel surfaces by using alcoholic solutions containing 0.01 molar to 2.0 molar cyclohexylamine borate, preferably 0.01 molar to 1.0 molar.

When the BTA is used alone in solution, its concentration is always at least 0.01 weight percent.

One should consider the fact that "over protection" of the cord with the treatment agents, such as BTA, can result in a cord, which, while resistant to corrosion, may not have the desired adhesion properties. Therefore care should be taken that the levels of the agent in the rubber or on the cord is not too high. For example, a 5 W/O BTA solution would give good protection to bare brass coated steel tire cord, however, adhesion to rubber may be very poor unless extraordinary compounding changes were instituted to account for the higher BTA levels on the tire cord.

In view of the above remarks and the fact that compounds naturally vary in activity, all statements herein re levels and amounts must be considered only as guidelines and not limitations.

While certain representative embodiments and details have been shown for the purpose of illustrating the invention, it will be apparent to those skilled in this art that various changes and modifications may be made wherein without departing from the spirit or scope of the invention.

I claim:

1. A method of improving the ability of a brass coated steel tire cord to adhere to rubber after vulcanization comprising cleaning the brass coated steel tire cord, treating the clean tire cord with benzotriazole and (A) cyclohexylamine borate and zinc chromate or (B) zinc chromate and then drawing said cord.

2. A method of improving the ability of a brass coated steel tire cord to adhere to rubber which comprises cleaning the brass coated steel tire cord after the brass coating step and prior to a drawing step and subsequently treating the cleaned tire cord prior to drawing with benzotriazole, cyclohexylamine borate and zinc chromate, the benzotriazole, borate and chromate all being present in the same aqueous solution.

* * * * *